United States Patent [19]

Misra et al.

[11] Patent Number: 5,024,334

[45] Date of Patent: Jun. 18, 1991

[54] METHOD AND MEANS FOR GRAVITY TABLE AUTOMATION

[75] Inventors: Manjit K. Misra; Yuh-Yuan Shyy, both of Ames, Iowa

[73] Assignee: Iowa State University Research Foundation, Inc., Ames, Iowa

[21] Appl. No.: 363,727

[22] Filed: Jun. 9, 1989

[51] Int. Cl.$^5$ .......................... B07C 5/342; B03B 4/00
[52] U.S. Cl. .................................... 209/557; 209/467; 209/472; 209/489; 209/491; 209/502; 209/503
[58] Field of Search ............... 209/557, 567, 571, 576, 209/577, 580, 586, 587, 589, 592, 598, 552, 484, 489, 491, 496, 502, 499, 422, 691, 694, 695, 471, 472, 458, 459, 490, 479, 477, 503, 474–476, 467

[56] References Cited

U.S. PATENT DOCUMENTS

| | | |
|---|---|---|
| 3,406,824 | 10/1968 | Forsberg . |
| 3,693,794 | 9/1972 | Oetiker .................................. 209/467 |
| 3,888,351 | 6/1975 | Wilson . |
| 3,888,352 | 6/1975 | Kulseth . |
| 3,933,249 | 1/1976 | Welsh et al. .......................... 209/557 |
| 4,265,744 | 5/1981 | Weiffen ............................ 209/496 X |
| 4,316,799 | 2/1982 | Satake ............................. 209/580 X |
| 4,652,362 | 3/1987 | Mueller ............................... 209/44.2 |
| 4,765,489 | 8/1988 | Satake ................................... 209/557 |

FOREIGN PATENT DOCUMENTS

| | | | |
|---|---|---|---|
| 623481 | 5/1979 | U.S.S.R. | ............................ 209/491 |
| 1258487 | 9/1986 | U.S.S.R. | ............................ 209/489 |

Primary Examiner—Donald T. Hajec
Attorney, Agent, or Firm—Zarley, McKee, Thomte, Voorhees & Sease

[57] ABSTRACT

A system for gravity table separation including a gravity table for separating materials and a detector operatively associated with the gravity table for detecting the movement of control particles with respect to the gravity table during its operation. The control particles are of a known characteristic. By calibrating the desired movement of the control particles through the table, any misalignment or deviance of that movement during operation is detected, and adjustments can be made to the operation of the table to bring the control particles back to the desired movement. The separation process can then be controlled to bring about optimum efficiency. Also, the detector can be interfaced with a control component which can automatically adjust the operation of the table in response to whether the control particles are following the desired movement through the table.

13 Claims, 6 Drawing Sheets

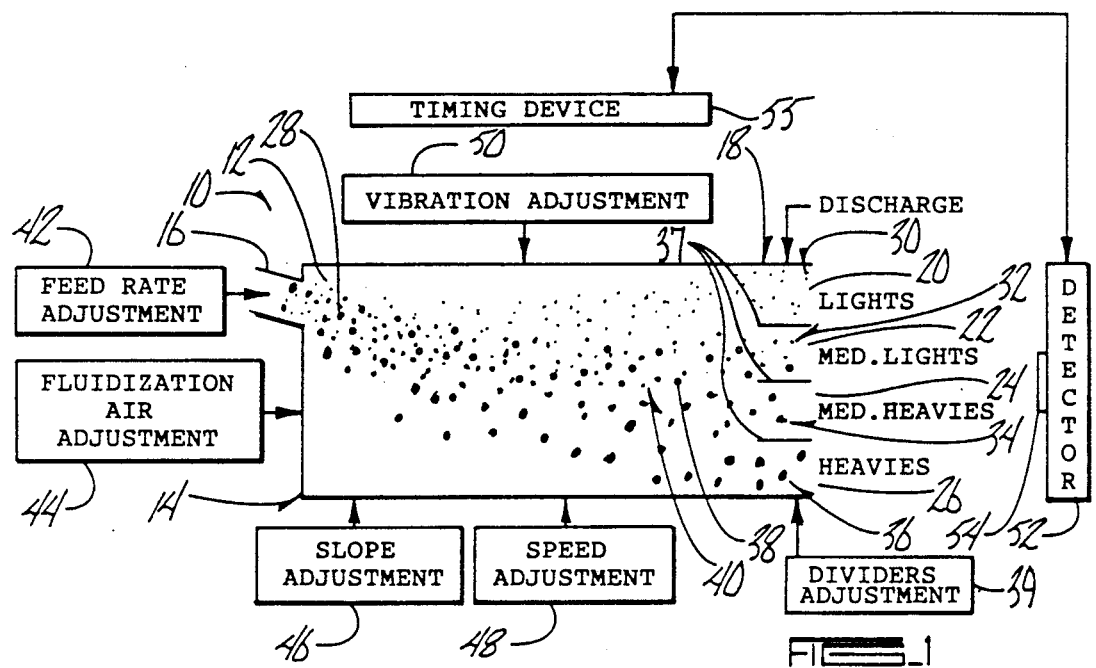
FIG_1
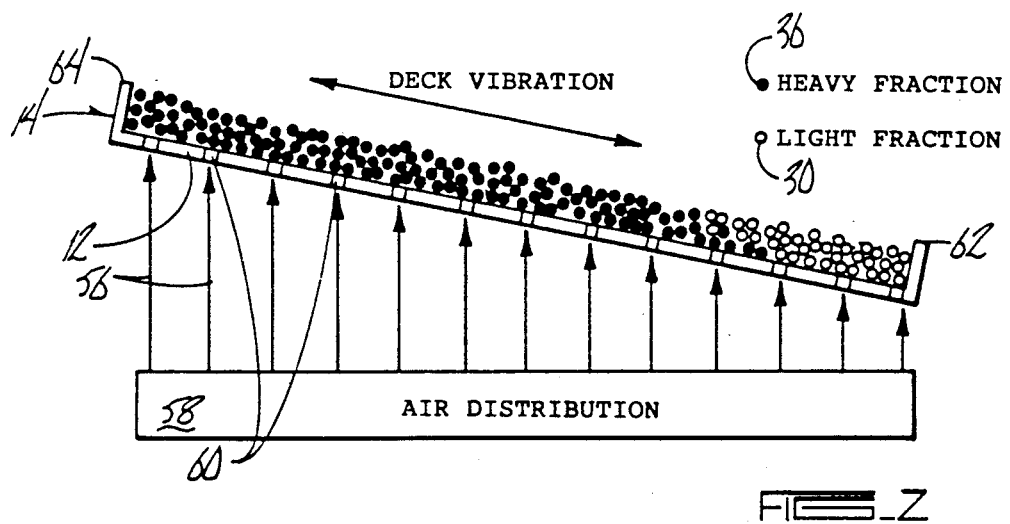
FIG_2

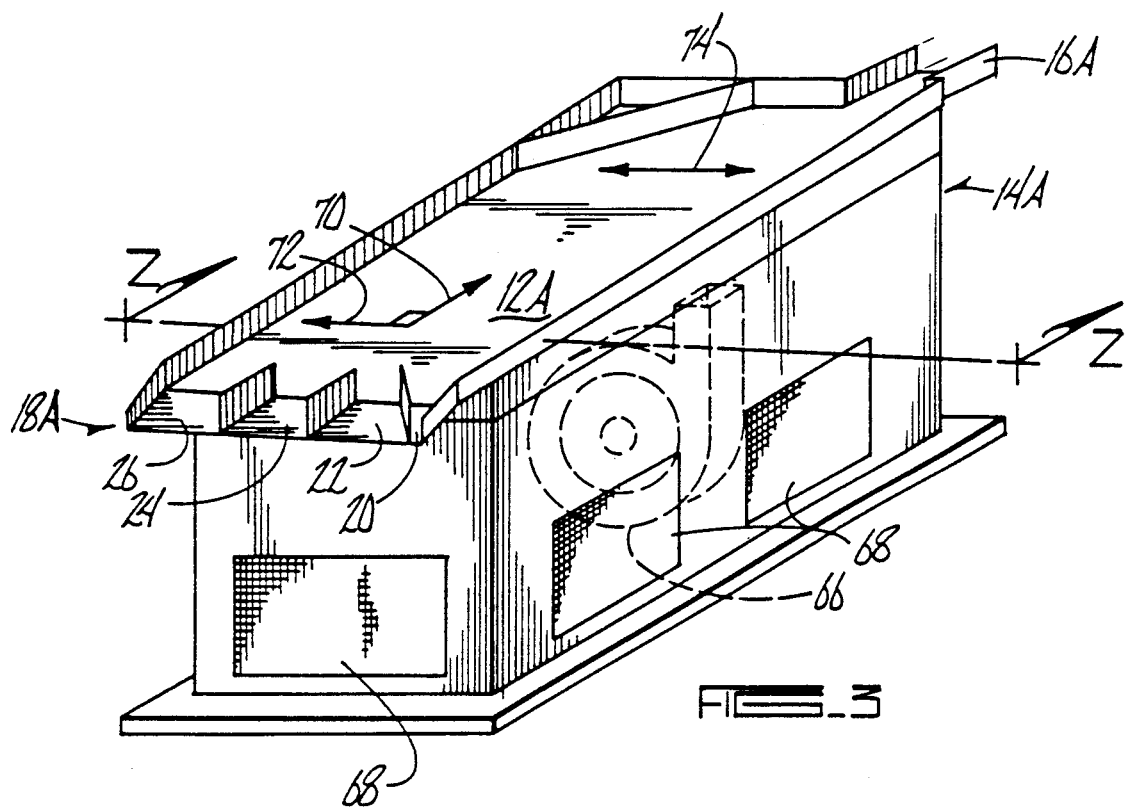
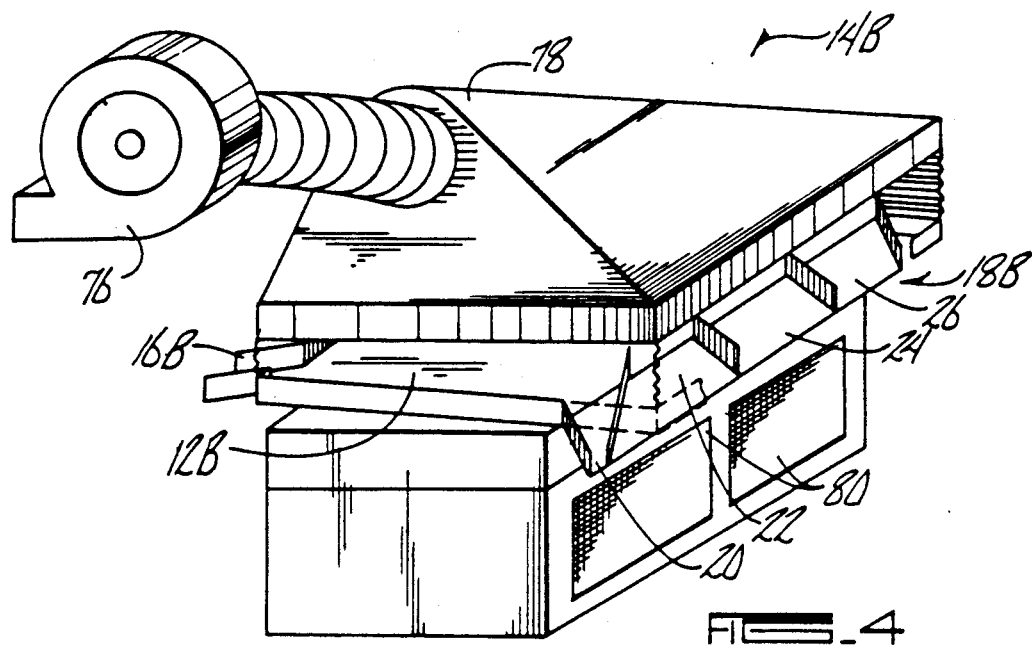

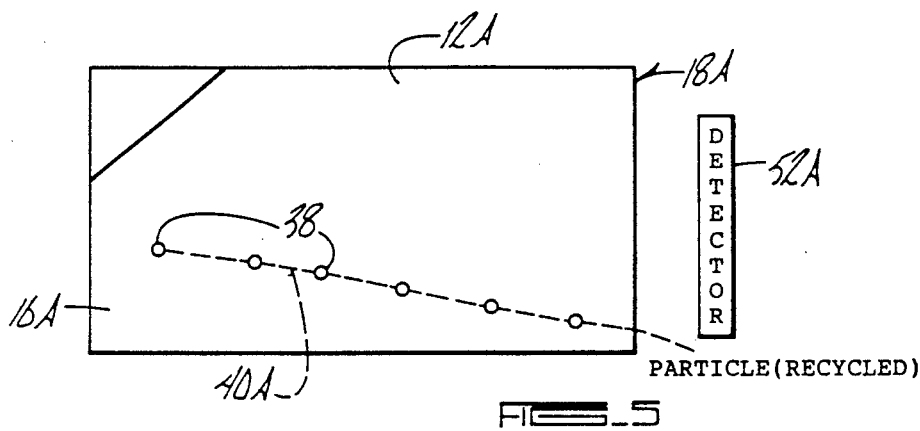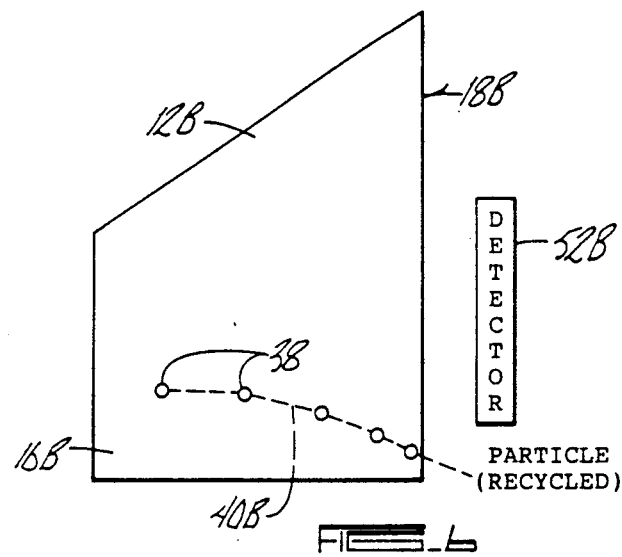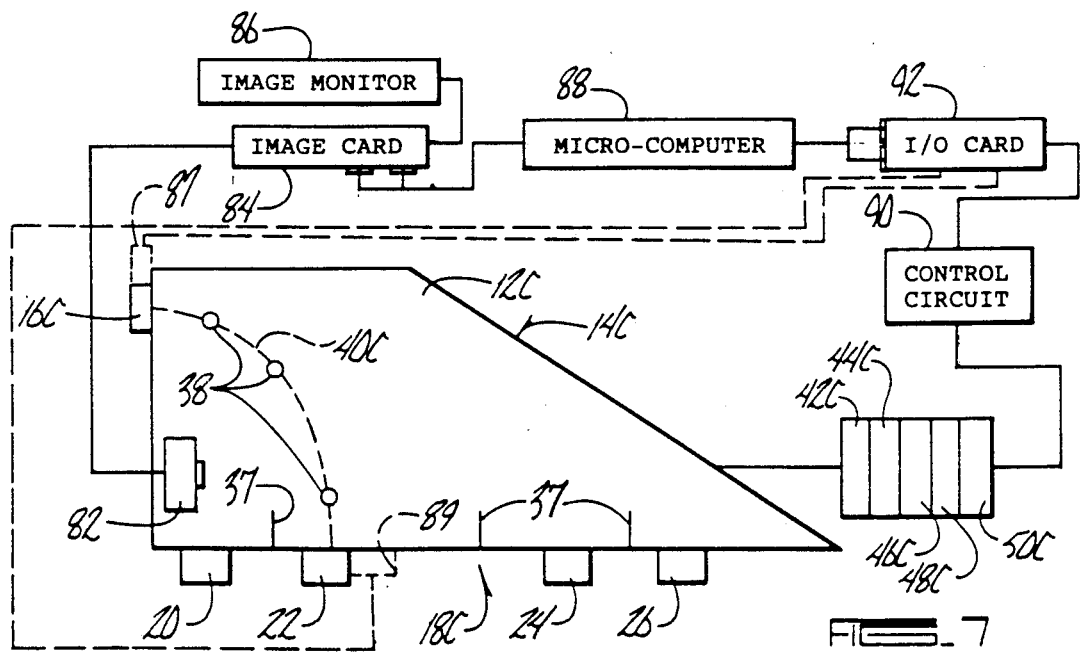

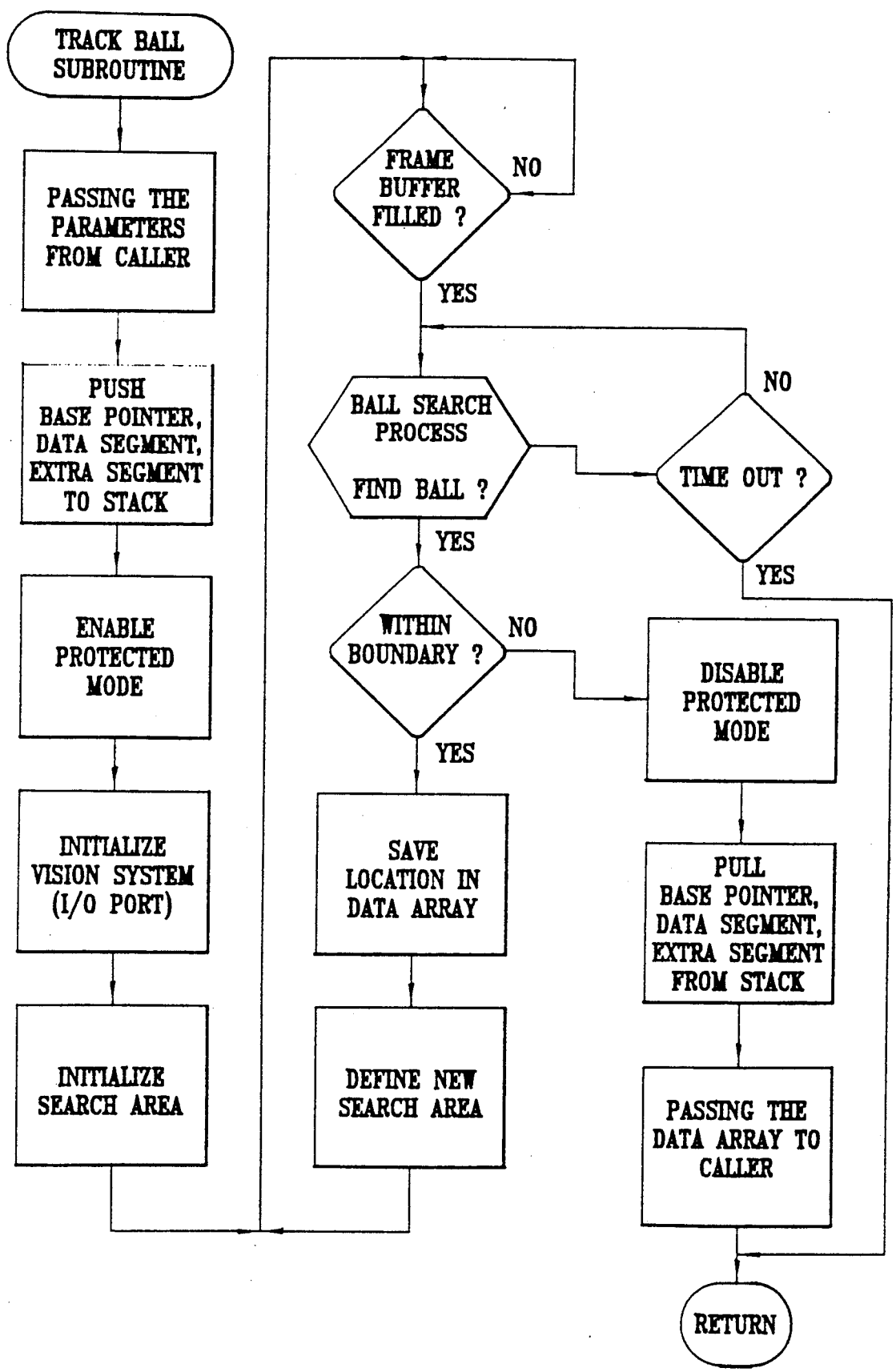
FIG_7

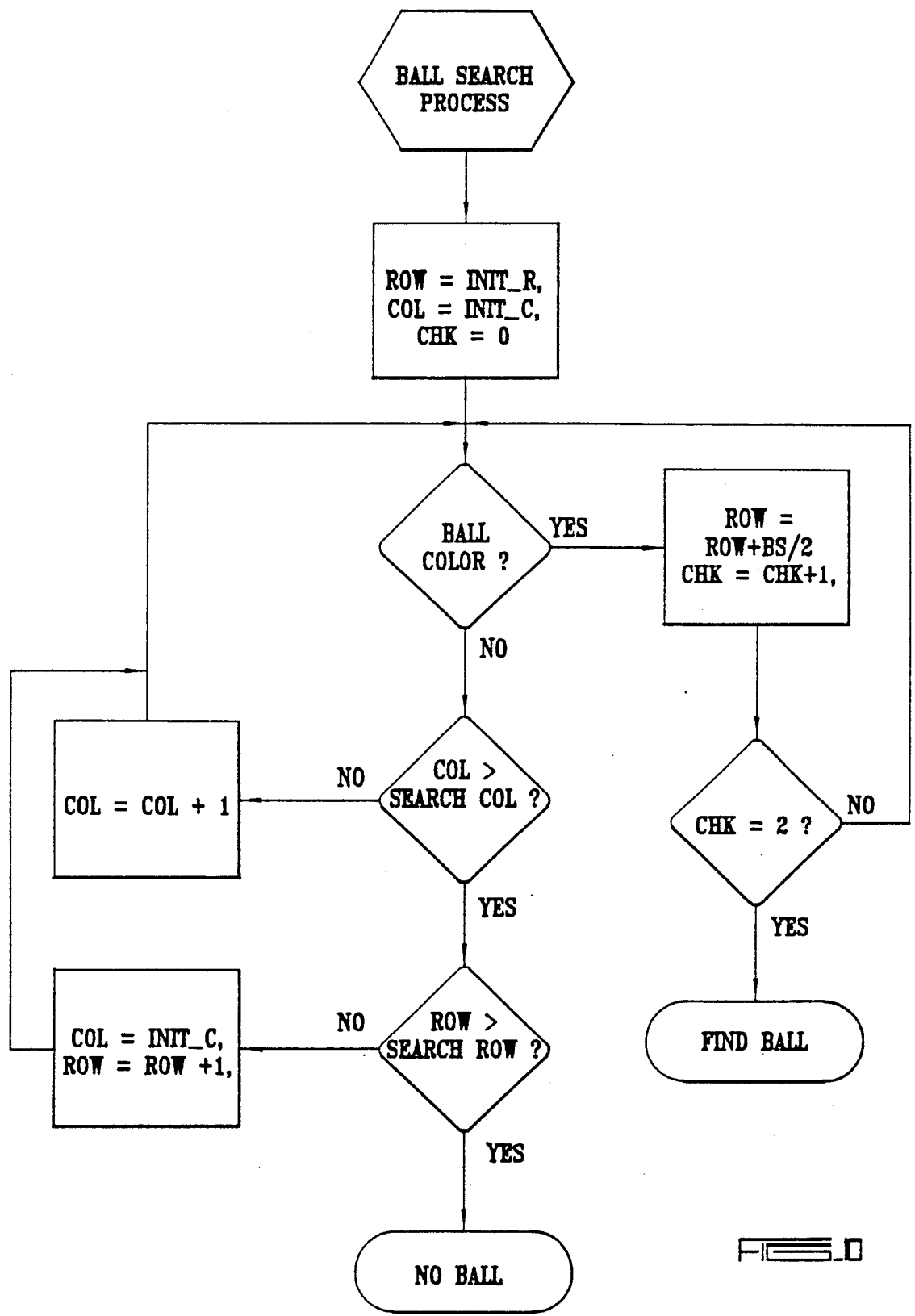

METHOD AND MEANS FOR GRAVITY TABLE AUTOMATION

BACKGROUND OF THE INVENTION a. Field of the Invention

The present invention relates to gravity tables, and in particular, to gravity tables used to separate materials of different sizes, weights, specific gravities and bulk densities, and systems to automate operation of gravity tables.

b. Problems in the Art

One mechanized method for separating materials of different qualities is the gravity table. This method is widely used in a variety of different separation processes. For example, it can be used to separate granular materials such as seeds, minerals, coffee, beans, etc. Gravity separators can classify materials by size, weight, specific gravity and bulk density; can separate chaff or other low density particles from higher density particles, such as in grain cleaning; and can improve germination of seeds by separating good quality, heavier seeds from low quality, diseased, or damaged lighter seeds. These are but a few of the many uses for gravity separators. Examples of other separation processes include, but are not limited to, separation of bones from meat and separation of copper from aluminum.

Gravity separators can take many forms and embodiments. Examples of gravity separators can be found in U.S. Pat. Nos. 3,888,352; 3,406,824; and 3,693,794; and are incorporated by reference herein as showing the general operating principles of gravity separators.

Although gravity tables are generally efficient in result, they are quite complex to operate to maximum efficiency. Conventional gravity tables generally have a number of operational adjustments which can alter the reliability of separation results. For example, the gravity table generally slopes in one or more directions between the entrance and discharge ends of the table. Many times the table is sloped in two directions; namely, downwardly from entrance to discharge, and downwardly transversely across the line from entrance to discharge. The table is also usually fluidized by air, either positively forced through perforations in the bottom of the table, or by suction above the table. The feed rate of the materials entering the table can also be adjusted. Finally, both the speed of vibration of the table, and the magnitude of vibration can generally be adjusted.

It can therefore be seen that alteration of one of these adjustments could materially affect the overall operation of the table. Furthermore, the adjustments are interrelated and the table has to be adjusted for different types of materials. A skilled operator is therefore required to make the table function to optimum efficiency.

Additional problems exist in that external factors also affect operation of the table. For example, air temperature and humidity significantly affects separation of materials such as seeds. Any changes in these factors can materially affect the reliability of separation results. Also, most times the material being separated does not have consistent properties during its separation, or between its initial feeding onto the table, and its ultimate separation. Finally, continuous operation of the machine also might alter the functioning of separation.

If the gravity table is misadjusted, excessive amount of good product may be lost with the discard from the gravity table or the undesirable product may be mixed with the good product resulting in poor quality. Both situations will result in adverse effects and possible loss of economic revenue for a company using such a gravity table.

Thus, gravity tables must constantly be monitored and adjusted to achieve optimum results. This requires significant skill of the operator, and comprehensive surveillance by the operator. Training and labor costs are therefore substantial.

These costs could be reduced if gravity tables could be automated.

It is therefore a principal object of the present invention to solve or improve over the problems and deficiencies in the art.

A further object of the present invention is to provide a means and method of gravity table automation which provides objective indication of a gravity table's operation.

Another object of the present invention is to provide a means and method as above described, which detects whether the gravity table is generally functioning to its desired level.

Another object of the present invention is to provide a means and method as above described which utilizes a detector means and control particles to continuously monitor operation of the table.

A further object of the present invention is to provide a means and method as above described which can be utilized to completely automate operation of the gravity table.

Another object of the present invention is to provide a means and method as above described which is efficient, economical, reliable and durable.

These and other objects, features, and advantages of the present invention will become more apparent with reference to the accompanying specification and claims.

SUMMARY OF THE INVENTION

The present invention includes a means and method for automation of a gravity table. The invention can take on many forms and embodiments.

The method of the invention involves introducing control particles of known physical properties to the material being separated on the deck of a conventional gravity table. The path and/or time of travel of the control particles through the table is monitored by a detector means. A desired path for the control particles is pre-selected for a particular separation process. If the control particles do not generally adhere to the desired pathway or the desired time of travel, the detector will observe such variances. The gravity table can then be adjusted to bring the control particles back in line on the desired pathway.

The means of the invention consists of operatively associating a detector means with the gravity table. The control particles are generally of such characteristic(s) as to be easily differentiated by the detector from the material being separated.

The method and means of the invention can also include the additional feature of having the detector communicate with a control means which controls operation of the gravity table. As the gravity table has a plurality of different adjustment features, such as feed rate, slope, vibration speed and magnitude, air fluidization level; the detector will give information to the control means which will allow the control means to instruct the change in any one or any combination of these adjustments if it observes the control particles are not following the desired path and/or travel time through the gravity table. The operation of the gravity table can then be made continuously automatic. The desired pathway and/or travel time for the control particles can be changed for different separation processes.

One example of a detector means and control particle(s) which could be utilized is a vision system whereby a video camera could capture a visual image of the surface of the gravity table. The control particles could be spheres having a distinctly contrasting surface (such as, for example, color, size or feature) from the materials being separated. Appropriate computer hardware and software could differentiate and identify the control particles as opposed to the material being separated, and be configured to interpret when the control particles are traveling in the desired pathway and/or at the desired time of travel, and when they are not. The computer could then be utilized to adjust operation of the gravity table when the control particles are not generally along the desired path and/or travelling at the desired rate. The computer could be programmed to adjust one or more of the adjustment features of the gravity table according to a predetermined protocol to achieve the optimum separation and efficiency of the gravity table.

The control particles can be introduced in a number of ways. For example, the control particles can be stored in a bin, dropped through a pipe from the bin one or more at a time to the material being separated on the deck of the gravity table. Alternatively, the control particles can be mixed with the material to be separated and the mixture can be introduced to the gravity table. In either of the case, the control particles can be recycled by screening them out of the mixture as they fall off the deck of the gravity table. The introduction of the control particles can also be automated by integrating it under the command of the computer that is used to detect the control particles and adjust the gravity table.

Yet another function of the computer vision system is to check the bubbling, empty spots or depth of the product on the deck. It is well known that excessive bubbling, empty spots or improper depth of product on the deck during operation can hurt the separation. The computer vision system will also check for these troubles at desired time intervals and will take corrective action. Thus, complete automation of the gravity table is achieved.

BRIEF DESCRIPTION OF THE DRAWINGS

FIG. 1 is a schematic of one embodiment of the invention.

FIG. 2 is an elevational sectional schematic portraying the general principles of operation of a conventional gravity table.

FIG. 3 is a perspective depiction of a conventional pressure-type gravity table.

FIG. 4 is a perspective depiction of a conventional suction-type gravity table.

FIG. 5 is a top view schematic depiction of a rectangular gravity table deck showing one desired pathway for the control particles.

FIG. 6 is a top view schematic depiction of a trapezoidal gravity table deck including one possible desired pathway for control particles.

FIG. 7 is a schematic depiction of a possible embodiment of the invention utilizing a video camera as a detector.

FIGS. 9 and 10 represent diagrammatical flowchart representations of some routines to facilitate the search for and tracking of control particles with the embodiment of the invention of FIGS. 7 and 8.

DETAILED DESCRIPTION OF THE PREFERRED EMBODIMENT

Figure 8:
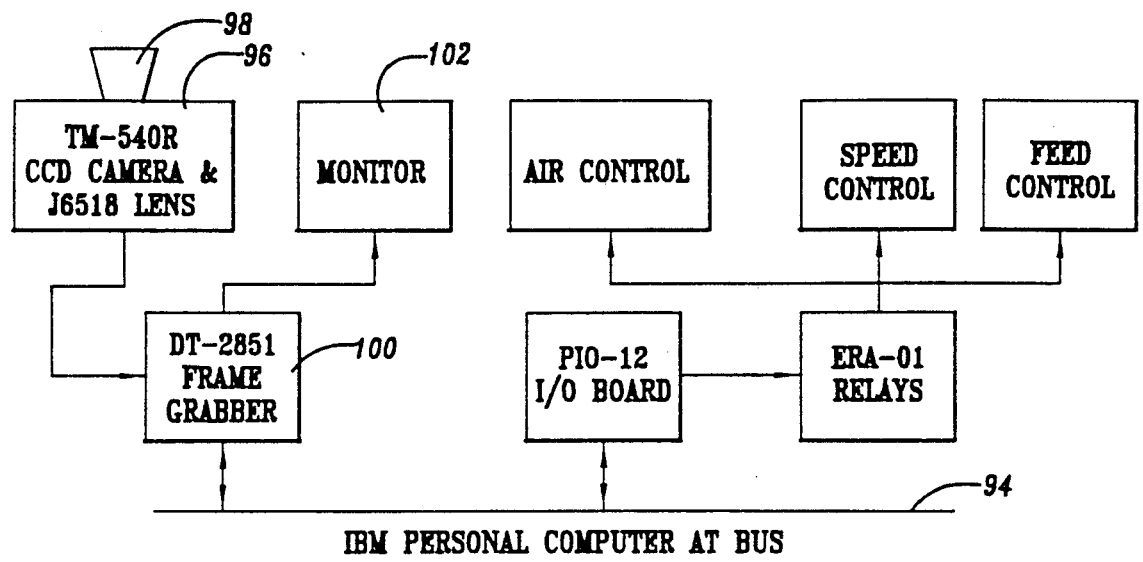
FIG. 8 is a schematic depiction of hardware connections for the embodiment of FIG. 7.

With reference to the drawings, a detailed description of the preferred embodiment of the invention will now be described. Some background regarding gravity tables will be discussed, but reference is given to the three previously incorporated-by-reference patents regarding the specific features and operation of gravity tables, which are well known within the art. It is to be understood that the purpose of this detailed description is to provide a specific example of how the general invention can be implemented. The general invention can take many different forms and embodiments, and is not limited by the following description of a preferred embodiment.

It is to be understood that this description will generally discuss use of the invention to separate materials of different weight; and materials which may have irregular or different sizes, specific gravities or bulk densities. An example of such material could be seeds. It is well known that gravity tables can be used to separate seeds.

With particular reference to FIG. 1, a general schematic of an embodiment of the invention is set forth, and shall be referred to as embodiment 10, for reference. A top view of the rectangular deck 12 of the gravity table 14 is depicted having a feed entrance 16, and a general discharge end 18. As can be seen, discharge end 18 is divided into sections. As is well known within the art, section 20 of discharge end 18 discharges the lightest separated materials 30 (in this example, seeds) from the incoming mixture of materials introduced through feed entrance 16; section 22 discharges light to medium materials 32; discharge section 24 discharges medium to heavy materials 34; and section 26 discharges heaviest materials 36. For purposes of reference the general mixture of all of the materials being separated shall be referred to as materials 28, and would consist of lightest, light to medium, medium to heavy and heaviest materials 30, 32, 34, and 36. The materials 30, 32, 34 and 36 are kept separate by putting dividers 37 on the discharge edge 18. The dividers 37 are adjustable by a dividers adjustment means 39 and can be manually moved along the discharge edge 18 to the position where each material (30, 32, 34 and 36) is being discharged.

As can also be seen in FIG. 1, control particle(s) 38 (can be one or more) have also been introduced through feed entrance 16 or directly onto deck 12 of gravity table 14. Control particles 38, in the preferred embodiment, are approximately of the same size and weight and therefore, as can be seen in FIG. 1, assume a generally consistent pathway between feed entrance 16 and section 22 of discharge end 18 of gravity table 14. For purposes of description, the defined path of control particles 38 shown in FIG. 1 shall be referred to as the desired path 40 for control particles 38.

Gravity table 14 separates materials by size, weight, specific gravity or bulk density. It does this by fluidizing the area above deck 12 with either pressurized air or suction. Additionally, deck 12 is vibrated, and is angled or tilted to allow gravity to work upon the materials being separated. The separation process is also varied by the rate at which the materials are fed through feed entrance 16.

Therefore, FIG. 1 shows that gravity table 14 has a feed rate adjustment 42, fluidization air adjustment 44, a slope adjustment 46, a vibration speed adjustment 48, a vibration magnitude adjustment 50 and a divider adjustment 39. Each of these adjustments controls the respectively defined parameters of gravity table 14. By adjusting these parameters individually, or in any combination, the accuracy, reliability and overall operation of separation by gravity table 14 can be altered.

FIG. 1 also shows that a detector 52 is operatively positioned and associated with respect to gravity table 14. Detector 52 has a differentiation mechanism 54 which is configured and positioned to reliably detect control particles 38. Differentiation mechanism 54 also must differentiate between control particles 38 and any of materials 28. It also must differentiate between control particles 38 and any other occurrences or items which exist or might enter the environment of gravity table 14. A timing device 55 is also utilized to time a control particle as it travels across at least a portion of the gravity table 14.

In normal operation, the operator must begin the separation process without specific information on how to adjust adjustments 42, 44, 46, 48, and 50 to achieve most accurate and efficient separation, other than previous experience and perhaps manufacturers recommendations. The output from the various sections of discharge end 18 must continually be manually monitored and sampled to check if the separation process is proceeding as desired. If not, the operator must utilize judgment and manually alter one of the adjustments to attempt to maximize separation accuracy and efficiency. This is a continuous and complex job requiring significant skill.

The present invention depicted in FIG. 1 automates this process by giving objective information to the operator regarding operation of gravity table 14. Control particles 38, being of known color, size, weight and density are fed, at a controlled rate, to deck 12 of gravity table 14. Detector 52 functions to identify the control particles and confirm that they are indeed following desired path 40, and out a desired discharge section of end 18.

The desired path of travel 40 of control particles can be preset from previous knowledge and experience. Alternatively, the operator can adjust the gravity table in the beginning to the desired efficiency and then a selected number of control particles can be fed to the deck and their path of travel recorded. From this, the desired path of travel 40 and the desired time of travel can be mathematically determined.

If subsequently control particles 38 stray significantly from the desired path 40, detector 52 will observe this and provide that information to the computer. The computer can then adjust the operation of gravity table 14 until detector 52 acknowledges the control particles 38 are again traveling the desired path 40 across deck 12.

FIG. 2 depicts in elevational cross-sectional form, more specifically the operation of gravity table 14. In this depiction, fluidization air 56 is directed by air distribution mechanism 58 through perforations 60 in deck 12 of gravity table 14. This air then fluidizes a mixture of materials 28, causing the light fraction, or lightest materials 30, to be lifted and caused by gravity to migrate to the lower side 62 of deck 12. On the other hand, the heaviest materials 36 sink to the bottom of the fluidized bed and migrate to the higher side 64 of deck 12 because of the deck vibration and friction.

FIGS. 3 and 4 show, in perspective, two complete gravity tables. FIG. 3 shows a pressure type gravity table 14A whereby fan 66 (it is possible to have more than one fan also) operates to pull air through air intakes 68 and distributes air up and through deck 12A to fluidize particles. It can be seen that deck 12A is sloped in two directions as shown by arrows 70 and 72. Gravity thus causes materials fed to deck 12A to travel down towards discharge end 18A, and also has the lateral slope shown in FIG. 2. Additionally, oscillation or vibration is lateral to the slope along the longitudinal axis of deck 12A as is shown by arrow 74. An appropriate motor or actuator means (not shown) would cause oscillation or vibration of deck 12A.

FIG. 4 depicts an alternative type of gravity table 14B; namely, a suction-type gravity table. It operates essentially the same as gravity table 14A, except that fan 76 creates a suction in hood 78 directly above deck 12B and pulls air through air intakes 80 from below deck 12B, and through it to fluidize the particles on table 14B. Table 14B is similarly sloped in two directions between its feed entrance 16B and its discharge end 18B.

FIGS. 5 and 6 are top views of rectangular deck 12A and trapezoidal deck 12B of pressure gravity table 14A and suction gravity table 14B of FIGS. 3 and 4, respectively. FIGS. 5 and 6 also schematically depict possible desired paths 40A and 40B for control particles 38 between the general feed entrance areas 16A and 16B, and respective discharge ends 18A and 18B. In either case, however, the known color, size, weight and density of control particles 38 allows calibration of the desired paths 40A and 40B, prior to operating gravity tables or within first few minutes of operation to separate material 28. Detectors 52A and 52B are then operatively associated with the respective gravity tables 14A and 14B to monitor the movement of the control particles 38. Any deviation beyond a certain range out of desired paths 40A and 40B indicates misadjustment of the respective gravity tables 14A or 14B. It is to be further understood that detectors 52A and 52B could be used to detect movement of the control particles, either with regard to their paths or with regard to time of travel across tables 16A and 16B, or both.

It is to be understood that the invention could include recycling apparatus (not shown) which could capture the control particles 38 and convey them back to feed entrance 16 for any of the gravity tables. Using a recycling apparatus would allow easy pre-calibration and pre-setting of the gravity table, and would allow for easy recalibration at any time.

It is further to be understood that in the preferred embodiment the control particles 38 are made to have known color, size, shape, weight, and density. However, the only requirement of the invention is that the control particles have some characteristic, usually physical characteristic, which enables the detector means to differentiate the control particles from the material being separated. Of course, one of the characteristics of the control particles that is essential that they move through the gravity table in a predictable way, so that their movement can be utilized to test and monitor the functioning of the gravity table.

It may be sufficient, for example, that the control particles be of a known density and color, without regard to size or weight. On the other hand, for some applications, it may be sufficient to have control particles of known size and weight, without regard to color or density. It may even be sufficient to have control particles of any known physical property, which have another detectable characteristic different from the materials being separated. An example of this would be that the materials being separated are seeds and the control particles are known density magnetized balls. Another example would be to have control particles of known density which are of such a dissimilar size to the materials being separated, that they can be easily differentiated by detecting size differences. Other characteristics for the control particle to allow detection by the detector include fluorescence, radioactivity, and other types of energy emitting configurations. Furthermore, the control particles could be identified by their contrast with the materials being separated.

FIG. 7 shows schematically in detail a primary preferred embodiment of the invention. Gravity table 14C has a trapezoidal deck 12C. A feed entrance 16C and sections 20C, 22C, 24C, and 26C, of general discharge end 18C with dividers 37 function according to conventional gravity table previously described. Gravity table 14C additionally include feed rate adjustment 42C, fluidization air adjustment 44C, slope adjustment 46C, vibration speed adjustment 48C, and vibration magnitude adjustment 50C.

In this embodiment, the detector comprises video camera 82, which is positioned so as to view the surface of trapezoidal deck 12C, and particularly near the discharge end 18C. Camera 82 is electronically connected to image card 84. Image card 84 contains appropriate electrical processing apparatus to process the image captured by camera 82. Image card 84 is also connected to image monitor 86, which can continuously display the field of view of video camera 82, or the processed image.

The micro-computer 88 is connected to receive information from image card 84, so that computer 88 can utilize the information from camera 82.

A control circuit 90 is electrically connected to the adjustment controls 42C, 44C, 46C, 48C, and 50C. An input-output (I/O) card 92 is connected between control circuit 90 and computer 88, and serves to convert signals from computer 88 or signals from control circuit 90 between digital and analog, as required.

The embodiment of FIG. 7 operates as follows. Camera 82 obtains a field of view of trapezoidal deck 12C of gravity table 14C. This visual image is sent to image monitor 86, and computer 88 through image card 84. Upon instruction, operation of gravity table 14C can be pre-calibrated by feeding control particles 38 onto deck 12C. By prior discovery or knowledge, the desired path 40C for control particles 38 can be selected. Another desirable parameter is the time it takes for the control particles to travel in the path from the feed end 16C to the discharge end 18C. Computer 88 would therefore be programmed to accept desired path 40C, and the time of travel.

It is to be understood that time of travel of control particles or particles 38 can be accomplished in different ways. One way would be to utilize the video system to time the control particles as they cross the field of view of the camera. This could be accomplished in software. Another alternative would be to use entrance and exit detectors 87 and 89 to provide information to computer 88.

The desired path 40C for control particles 38 would be selected according to what types of materials 28C are going to be separated. This can also be pre-set into computer 88 or obtained in the first few minutes of operation. Computer 88 would then be configured to be ready to adjust any of the adjustments to gravity table 14C according to an instruction from it.

The material to be separated would then be fed, with control particles 38 through feed entrance 16C, and operation of gravity table 14C would be commenced. Camera 82 would function as a detector to monitor the path and/or the time of travel of control particles 38, which would have a surface, reflectivity, or color which would highly contrast with the material being separated. Image card 84 and computer 88 would be pre-configured to differentiate the visual contrast between control particles 38 and the material being separated. The software would essentially process and analyze the images from camera 82 on a continuous basis and monitor whether or not control particles 38 are generally within the desired path 40C and the time of travel. If so, gravity table 14C would be allowed to continue to operate at present adjustment. However, if control particle 38 deviates from desired path 40C by a pre-selected amount and/or takes too much or too little time to travel the path, this would be detected by the software in computer 88 based on the visual image from camera 82. Computer 88 would then issue instructions through I/O card 92 to control circuit 90 to alter any one or combination of the adjustments to gravity table 14C to alter its operation until control particles 38 are brought back onto desired path 40 a sufficient amount and the time of travel is acceptable. The software of computer 88 would adjust the adjustments to gravity table 14C by a pre-selected protocol or procedure.

FIG. 7 depicts one basic schematic representation of the invention utilized with a video camera as detector. FIG. 8, shows a specific schematic of devices and hardware connections to enable an embodiment like FIG. 7 to function.

In FIG. 8, communication between the various elements is made possible by a database associated with a IBM personal computer, model AT (denoted by reference numeral 94). The detector is comprised of a video camera 96 which in the preferred embodiment is a TM-540R remote imager CCD camera available from Pulnix American, Inc., 770-A Lucerne Drive, Sunnyvale, Calif. 94086. Camera 96 includes a lense 98 which in the preferred embodiment is a J6518 wide-angle lense from Gevelin Electronics, Inc., 19831 Magellan Drive, Torrance, Calif. 90502, and which is compatible with camera 96.

The signal from camera 96 is communicated to a frame grabber 100 which can communicate information to or from database 94. Frame grabber 100 can be, in the preferred embodiment, a DT2851 high resolution frame grabber, available from Data Translation, Inc., 100 Locke Drive, Marlborough, Mass. 01752-1192. A monitor 102, in the preferred embodiment, is a JC-14013A NEC multi-sync color monitor, from NEC Home Electronics (USA), Inc., 1255 Michael Drive, Wood Dale, Ill. 60191-1094. It is in communication with frame grabber 100 and can display images from frame grabber 100.

The combination of camera 96, frame grabber 100, and monitor 102, allows the invention to view the deck of the gravity table and then according to computer control, select images received by the camera 96 and display them on monitor 102. Those images can also then be analyzed to detect the position of control objects or particles 38, such as polypropylene spheres of general uniform size and density, to monitor whether the gravity table is operating properly. The processed image is displayed on monitor 102 and is updated every field.

FIG. 8 also shows that air control 104, speed control 106, and feed control 108 can be operated by the hardware system. An input/output board 110 communicates with database 94, and processes instructions from database 94 and sends them to relays 112. In the preferred embodiment, input/output board 110 can be a 24 bit parallel digital I/O interface, model PI012 from Metra Byte Corporation, 440 Myles Standish Boulevard, Taunton, Mass. 02780. Each of the air, speed, and feed controls 104, 106, and 108, for the gravity table can be gear motors available from Grainger, Inc., 5959 West Howard St., Chicago, Ill. 60648, under the product designation model 2Z810 (21 rpm 115 V AC/DC right-angle gear motors). Motor relays 112 can therefore be in the preferred embodiment 8 channel SPDT (single-pole, double-throw) relay output accessory board, model ERA-01, from Metra Byte Corp., 440 Myles Standish Boulevard, Taunton, Mass. 02780.

FIG. 8 therefore shows that the IBM AT personal computer can take information from camera 96 through frame grabber 100, process it, and then control air, speed, and feed by virtue of identification of the position of control particles (propropylene spheres) as previously described.

FIGS. 9 and 10 show flowcharts for the programming of the IBM AT computer. FIG. 9 shows the ball tracking subroutine. FIG. 10 depicts the ball search process subroutine.

Figure 11:
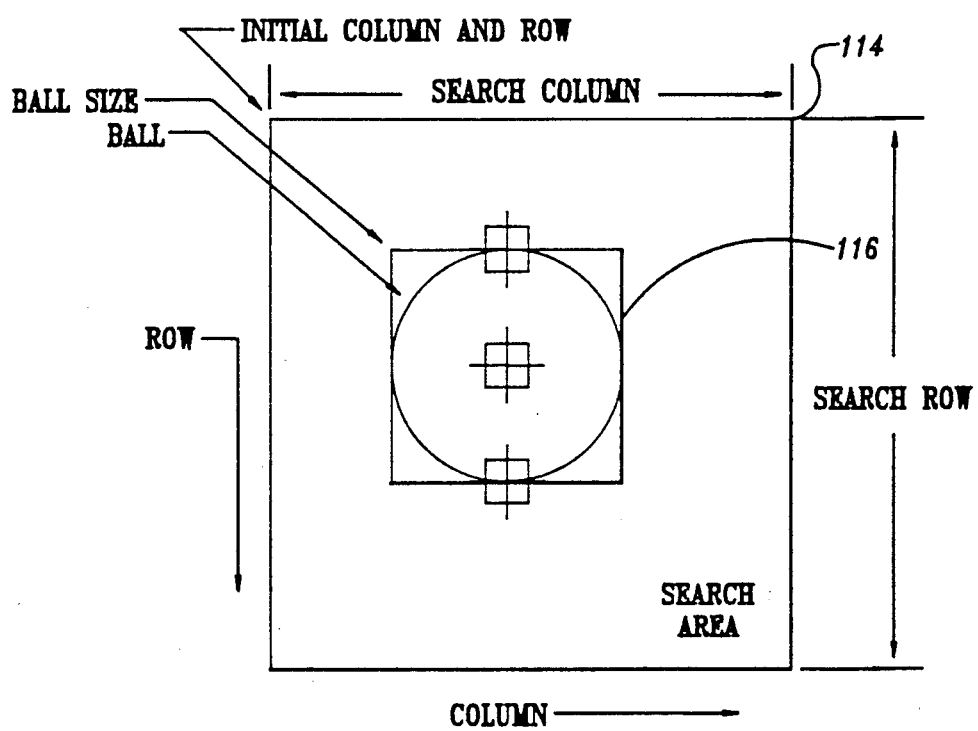
FIG. 11 is a schematic depiction of the formatted search or detection area for control particles, for the embodiment of FIGS. 8-10.

FIG. 11 depicts one possible frame of reference which can be set up to facilitate the subroutines of FIGS. 9 and 10. FIG. 11 shows that the field of view of camera 96 can be formatted into a plurality of basically rectangular search areas 114, which are in turn formatted into a plurality of rows and columns to define a total search area. When the gravity table is operating, and the video camera 96 is operating, frame grabber 100 can sequentially select and store individual frames being recorded by camera 96. A search process can then take place by scanning each frame, which is broken down into the plurality of search areas 114, to see if the control particle (ball 116) can be identified. If ball 116 is identified, the particular location of the search area 114 for that frame is recorded. This process is continued recursively so that each ball 116, that falls within the search areas 114, can be tracked.

With this information, in correlation of the position on the selected frames taken from frame grabber 100 with the actual position of balls 116 as they travel down the gravity table, the system can detect whether the gravity table is operating as intended.

As can be understood, the speed of scanning which is possible with the computer, allows frame grabber 100 to operate very quickly, to allow a high number of frames to be scanned for each time period.

As can be seen in FIGS. 9 and 10, if the ball or balls 116 are not detected, or are detected outside of the preestablished boundaries for desired operation of the gravity table, the system would have the information needed to be able to know what needs to be changed, as far as operation of the gravity table, to bring the balls 116 back into the desired path.

In the preferred embodiment described with respect to FIGS. 8-11, the control particles are polyprolence balls, available from Small Parts, Inc., 6891 Northeast Third Avenue, P.O. Box 381736, Miami, Fla. 33238-1736, under product designation BPP-8 (⅛" diameter).

It can therefore be seen that the present invention achieves at least all of its stated objectives.

It is to be appreciated that the present invention can take many forms and embodiments. The true essence and spirit of this invention are defined in the appended claims, and it is not intended that the embodiment of the invention presented herein should limit the scope thereof.

For example, the detector for monitoring whether the control particles follow the desired path can take on many different forms. While a vision system is presented in the preferred embodiment, the detector could alternatively be, for example, a magnetic detector, with the control particles being magnetized. Still further, an example of the detector could be some sort of a photoelectric apparatus, or one based on size of the control particles differentiated from size of any of the particles being separated. As another example, the detector could simply be a timing means to simply time movement of the control particle from its introduction to the gravity table to its exit from the gravity table. In the preferred embodiment described with respect to FIGS. 8-11, timing could be facilitated with use of the camera. The field of view of the camera could be set to cover the entire surface of the gravity table. By utilizing the software, when a control particle is first recognized entering the gravity table, a software clock could be started which would time travel of the control particle until it leaves view of the camera; that is, drops off of the gravity table. Timing of the control particles therefore, in some instances, could produce sufficient information to automatically control operation of the gravity table. These alternative examples are given for example only, and not by way of limitation.

What is claimed is:

1. A gravity separation table automation means comprising:

a gravity separation table for separating materials including one or more adjustment means for controlling operation of the table;

control particles having generally uniform movement characteristics relating to one or more of the set comprising size, weight, density, and specific gravity, and following a generally similar predictable movement through the table during operation;

detector means operatively associated with the gravity separation table for detecting the predictable movement of the control particles during operation of the gravity table, the control particles having at least one known detectability characteristic which is detectable by the detector means and which differentiates the control particles from the materials being separated; and the detector means further comprising a timing means for the control particles movement through at least a portion of the gravity separation table.

2. A method of automating a gravity separation table comprising:
   feeding a mixture of granular material to be separated and at least one control particle to the table;
   detecting whether each control particle generally follows a desired movement between entrance and discharge from the table;
   adjusting operation of the table to cause each control particle to generally follow the desired movement between entrance and discharge of the table; and
   adjusting operation of the table to cause each control particle to generally follow the desired movement comprising a desired time between entrance and discharge of each control particle on the table.

3. A means for gravity table automation comprising:
   a gravity table for separating materials including one or more adjustment means for controlling separation operation of the table;
   control particles having generally uniform movement characteristics relating to one or more of the set comprising size, weight, density, and specific gravity, and following generally similar predictable desired movement through the table during operation;
   detector means operatively associated with the gravity table for detecting the general movement of control particles between entrance and discharge during operation of the gravity table, the control particles having at least one known detectability characteristic which is detectable by the detector means and which differentiates the control particles from the materials being separated, the detector means including signal means for producing a signal indicating whether the control particles are generally following the desired movement;
   the detector means further comprising a discrimination means for identifying and discriminating between control particles, the material being separated, and any other part of the environment of the gravity table, the discrimination means comprising a magnetic sensor, and the control particles being magnetized; and
   control means for adjusting operation of one or more of the adjustment means of the gravity table in response to the control signal.

4. A means for gravity table automation comprising:
   a gravity table for separating materials including one or more adjustment means for controlling separation operation of the table;
   control particles having generally uniform movement characteristics relating to one or more of the set comprising size, weight, density, and specific gravity, and following generally similar predictable desired movement through the table during operation;
   detector means operatively associated with the gravity table for detecting the general movement of control particles between entrance and discharge during operation of the gravity table, the control particles having at least one known detectability characteristic which is detectable by the detector means and which differentiates the control particles from the materials being separated, the detector means including signal means for producing a signal indicating whether the control particles are generally following the desired movement;
   the detector means further comprising a discrimination means for identifying and discriminating between control particles, the material being separated, and any other part of the environment of the gravity table, the discrimination means including means to discrimination size differences between control particles and other particles; and
   control means for adjusting operation of one or more of the adjustment means of the gravity table in response to the control signal.

5. A means for gravity table automation comprising:
   a gravity table for separating materials including one or more adjustment means for controlling separation operation of the table;
   control particles having generally uniform movement characteristics relating to one or more of the set comprising size, weight, density, and specific gravity, and following generally similar predictable desired movement through the table during operation;
   detector means operatively associated with the gravity table for detecting the general movement of control particles between entrance and discharge during operation of the gravity table, the control particles having at least one known detectability characteristic which is detectable by the detector means and which differentiates the control particles from the materials being separated, the detector means including signal means for producing a signal indicating whether the control particles are generally following the desired movement;
   the detector means including timing means for timing movement of the control particles over at least a portion of the gravity table; and
   control means for adjusting operation of one or more of the adjustment means of the gravity table in response to the control signal.

6. The means of claim 5 wherein the means for timing and the detector means are operatively connected to the control means.

7. A gravity separation table automation means comprising:
   a gravity separation table for separating materials including one or more adjustment means for controlling separation operation of the table;
   the control particles are of at least one known characteristic taken from the set of color, size, weight, density, and specific gravity having generally uniform movement characteristics relating to one or more of the set comprising size, weight, density, specific gravity, and following generally similar predictable movement through the table during operation;
   detector means operatively associated with the gravity separation table for detecting the movement of the control particles during operation of the gravity separation table, the control particles having at least one known detectability characteristic which is detectable by the detector means and which differentiates the control particles from the materials being separated, and for generating a signal indicating substantial variance of the control particles from the predictable movement;
   the predictable movement of the control particles relating to at least one of the set of path of travel and time of travel through the gravity separation table; and control means for monitoring the detector means and automatically altering one or more adjustment means upon receipt of the signal.

8. A means for gravity table automation comprising:

a gravity table from separating materials including one or more adjustment means for controlling separation operation of the table;

control particles having generally uniform movement characteristics relating to one or more of the set comprising size, weight, density, specific gravity, and following generally similar predictable movement through the table during operation;

detector means operatively associated with the gravity table for detecting the general movement of control particles between entrance and discharge during operation of the gravity table, the control particles having at least one known detectability characteristic which is detectable by the detector means and which differentiates the control particles from the material being separated, the detector means including signal means for producing a signal indicating whether the control particles are generally following the desired movement, the detector means including a discrimination means for identifying and discriminating between control particles, the material being operated, and any other part of the environment of the gravity table, the discrimination means comprising a video system adapted to identify and discriminate the control particles; and control means for adjusting operation of one or more of the adjustable means of the gravity table in response to the control signal.

9. The means of claim 8 wherein the control particles are discriminated and identified by contrast.

10. A means for gravity table automation comprising:

a gravity table from separating materials including one or more adjustment means for controlling separation operation of the table;

control particles having generally uniform movement characteristics relating to one or more of the set comprising size, weight, density, specific gravity, and following generally similar predictable movement through the table during operation;

detector means operatively associated with the gravity table for detecting the general movement of control particles between entrance and discharge during operation of the gravity table, the control particles having at least one known detectability characteristic which is detectable by the detector means and which differentiates the control particles from the materials being separated, the detector means including signal means for producing a signal indicating whether the control particles are generally following the desired movement, of at least one known characteristic taken from the set of color, size, weight, density, and specific gravity, where the control particles are discriminated and identified by the reflectance of the control particles; and control means for adjusting operation of one or more of the adjustable means of the gravity table in response to the control signal.

11. A means for gravity table automation comprising:

a gravity table from separating materials including one or more adjustment means for controlling separation operation of the table;

control particles having generally uniform movement characteristics relating to one or more of the set comprising size, weight, density, specific gravity, and following generally similar predictable movement through the table during operation;

detector means operatively associated with the gravity table for detecting the general movement of control particles between entrance and discharge during operation of the gravity table, the control particles having at least one known detectability characteristic which is detectable by the detector means and which differentiates the control particles from the materials being separated, the detector means including signal means for producing a signal indicating whether the control particles are generally following the desired movement of at least one known characteristic taken from the set of color, size, weight, density, and specific gravity, where in the discriminator means comprises of photo-electric means; and control means for adjusting operation of one or more of the adjustable means of the gravity table in response to the control signal.

12. A gravity separation table automation means comprising:

a gravity separation table for separating materials including one or more adjustment means for controlling separation operation of the table;

control particles having generally uniform movement characteristics relating to one or more of the set comprising size, weight, density, specific gravity, and following generally similar predictable movement through the table during operation;

detector means operatively associated with the gravity separation table for detecting the movement of the control particles during operation of the gravity separation table, the control particles having at least one known detectability characteristic which is detectable by the detector means and which differentiates the control particles from the materials being separated, and for generating a signal indicating substantial variance of the control particles from the predictable movement, the detector means comprising a timing means for the control particles' movement through at least a portion of the gravity separation table;

the predictable movement of the control particles relating to at least one of the set of path of travel and time of travel through the gravity separation table; and control means for monitoring the detector means and automatically altering one or more adjustment means upon receipt of the signal.

13. A method of automating a gravity separation table comprising:

feeding a mixture of granular material to be separated and at least one control particle to the table;

detecting whether each control particle generally follows a predicted desired path between entrance and discharge from the table; and adjusting operation of the table to cause each control particle to generally follow the desired path between entrance and discharge of the table, the adjustments to operation of the table including at least one of adjusting feed rate of the mixture to the table, adjusting fluidization of the mixture with respect to the table, adjusting slope in a least one direction of the table, adjusting vibration speed of the table, adjusting magnitude of vibration of the table, and the adjustments to operation of the table are made in response to detecting that the control particles are not generally following the desired path between entrance and discharge of the table;

detecting whether each control particle generally takes the desired time between the entrance and discharge from the table; and adjusting operation of the table to cause each control particle to generally follow the desired time between entrance and discharge of the table.

* * * * *